United States Patent

Kravetz et al.

[11] Patent Number: 5,179,423
[45] Date of Patent: Jan. 12, 1993

[54] GAIN STABILIZED SELF-SCANNING PHOTO-DIODE ARRAY

[75] Inventors: Alan Kravetz, New Windsor; Harold Van Aken, Wallkill; Kenneth Garde, New Windsor, all of N.Y.

[73] Assignee: Kollmorgen Corporation, Simsbury, Conn.

[21] Appl. No.: 736,721

[22] Filed: Jul. 26, 1991

[51] Int. Cl.$^5$ .......................... G01J 3/42; G01J 3/02
[52] U.S. Cl. ................................. 356/328; 250/208.3
[58] Field of Search ............... 356/300, 308, 309, 319, 356/326, 328; 250/208.1, 208.2, 208.3, 214 AG

[56] References Cited

U.S. PATENT DOCUMENTS

| | | |
|---|---|---|
| 4,076,421 | 2/1978 | Kishner . |
| 4,437,762 | 3/1984 | Glenn et al. .................. 356/326 |
| 4,947,348 | 8/1990 | Van Arsdell .................. 364/523 |

FOREIGN PATENT DOCUMENTS

| | | | |
|---|---|---|---|
| 346878 | 12/1989 | European Pat. Off. ...... | 250/214 AG |
| 207015 | 10/1985 | Japan ........................... | 250/214 AG |

OTHER PUBLICATIONS

Horlick, *Applied Spectroscopy*, No. 2, vol. 30, 1976, pp. 113–123.
Vogt et al., *Applied Optics*, vol. 17, No. 4, Feb. 15, 1978, pp. 574–592.
Wood, *SPIE* vol. 172 *Instrumentation in Astronomy, III*, 1979 pp. 67–70.
Talmi et al., *Applied Optics*, vol. 19, No. 9, May 1 1980, pp. 1401–1414.
Article by Tseng, et al., *Evolution of the Solid State Image Sensor*, Journal of Imaging Science, vol. 29, No. 1, Jan./Feb. 1985, pp. 14–15 Through 14–21.
Application Note, *Photosite Transfer Loss*, 1989 Fairchild Weston CCD Imaging Databook, titled CCD Sensors, System & Developmental Technology, pp. 271, 273 by Fairchild Weston Systems, CCD Imaging Division.
Application Note, *Image Lag*, 1988 Toshiba CCD Image Sensor Databook (3rd Edition) Toshiba Corporation, p. 24.

*Primary Examiner*—F. L. Evans
*Attorney, Agent, or Firm*—Morgan & Finnegan

[57] ABSTRACT

A method and apparatus for stabilizing the gain of a self scanned photo-diode array is provided for use with spectrophotometers and other light measurement equipment. A gain stabilizer light emitting diode (LED) constantly illuminates the array so that photons are continuously impinging upon the self-scanned photo-diode array. In the course of a typical measurement sequence, an illuminated scan is first taken, wherein said photo-diode array is illuminated by LED and the light being analyzed, followed by a dark reading wherein the photo diode array is illuminated by the LED only. The dark reading measurement is then subtracted from the illuminated reading to derive an accurate reading of the light being analyzed.

14 Claims, 3 Drawing Sheets

GAIN STABILIZED SELF-SCANNING PHOTO-DIODE ARRAY

BACKGROUND OF THE INVENTION

The present invention relates generally to optical measurements and use of diode array structures in spectrophotometers and other optical systems.

Generally self-scanned photo diode array structures operate as solid state image sensors utilizing reversed bias p-n junction photo-diodes in an integrating or storage mode. By monitoring the charge removed periodically to re-establish the initial voltage condition of a p-n junction element in the structure, one may obtain a signal proportional to the incident illumination. (See Tsang et al., "Evaluation of the Solid State Image Sensor" J. Imaging. Sci, V.29, Number 1, January/February 1985,. Examples of image sensors are p-n junction diodes as used in self-scanned photo-diode arrays, or an MOS induced junction as used in charge injection arrays (CID), and charge coupled arrays (CCD).

One application of charge storage photo-diode structures is in spectrophotometers and similar optical systems. Spectrophotometers are optical instruments that measure the amount of light transmitted or reflected by a sample as a function of the wavelength of the light See, e.g. U.S. Pat. No. 4,076,421 issued to Kishner. Pulsed xenon light enters a polychrometer via an entrance slit after reflecting off a sample. This light impinges on a grating which disperses the light and focuses it upon a linear array charge storage photodiode structure. The grating separates the incident light into its component wavelengths by deflecting each wavelength by a unique angle. The result is an image of the spectral components in the plane of the charge storage photo-diode structure. Therefore, each element of the charge storage photo-diode structure converts the photonic signal corresponding to the incident wavelength into a corresponding electrical signal.

A typical design choice for selecting a charge storage photo-diode structure in a spectrophotometer is a charge coupled device (CCD). The application of CCD technology to image sensing is described in Tseng, "Evolution of the Solid-State Image Sensor", J. Imaging Sci., V. 29, No. 1, p. 14–20 (1985). CCD's, however, have two drawbacks in a spectrophotometer intended for efficient use with a limited power supply, such as a battery pack. These two drawbacks are photo site transfer loss (PSTL) and image lag (IL).

Photo site transfer loss (PSTL), as described in "Application Note: photosite transfer loss," *CCD sensors, systems and developmental technology,* (1989 Fairchild Weston CCD Imaging Databook), is a phenomenon which degrades the transfer of charge packets from the photo sites into the CCD shift register(s). The effect of PSTL is observed by using a CCD which is not illuminated for a substantial period of time. A light source is then switched on the array for few successive integration periods. Assuming that the output of CCD should be $V_{signal}$, then for $0 > PSTL < 100\%$ of $V_{signal}$, the output signal resulting from the first illuminated integration time will be attenuated, due to the PSTL of the CCD. The output of the CCD for the following integration times is $V_{signal}$.

An interrelated phenomenon to PSTL is image lag (IL) which as described in the reference on "Image Lag" Toshiba CCD Image Sensor Databook (3rd Edition) Toshiba Corporation, occurs when the signal charge in the area under the storage electrode of the photo-diode is not completely shifted to the transfer region. Instead, part of the signal is added to the following signal. For example, when the charge coupled device (CCD) is used in a copying machine and the first copy to be made is of a white image and the second copy to be made is of a black image, the copy of the black image will come out gray instead of black because not all the signal which was generated by the white image was transferred.

Due to the PSTL and Image Lag phenomena inherent in CCD's, accurate color analysis by spectrophotometer becomes extremely difficult or inefficient. For example, readings taken after the first illuminated scan following a substantial unilluminated period are attenuated by PSTL, and the readings taken after the first non-illuminated scan indicate the presence of some decaying prior signal. In order to measure a dark object after an illuminated scan, one should wait for a certain period of time so that the amount of Image Lag has decreased to avoid false readings.

PTSL in some circumstances can be somewhat reduced by adding optical bias light or "fat zero" to the incident illumination. This bias light, however, cannot eliminate the Image Lag. As described in Toshiba CCD Image Sensor Data Book on page 24, the amount of Image Lag is influenced by the opening time of the shift gate. Therefore in applications requiring very short gating intervals Image Lag remains a problem.

The problems of Image Lag and PSTL become even more important in applications requiring a high degree of accuracy. One such application is color analysis by spectrophotometer. Many industrial applications require matching, sorting or formulating colors accurately with consistent repeatability.

With a portable spectrophotometer the problem is more acute since it must be operated from a battery for long periods of time without recharging or replacing the battery. In such applications, ideally only one illuminated scan should be taken from the color sample in order to minimize the energy used by a light source (e.g., pulsed xenon source). In addition, the light source must illuminate the sample for an extremely short duration to prevent heating of sensitive samples. Another application requiring a short duration scan is when the sample is moving such that it is available for measurement only for a short period of time. The necessity of such short duration pulses further aggravates the PSTL and Image Lag problems. As the effects of PSTL and Image Lag cannot be easily eliminated, accurate measurements by CCD's cannot be readily accomplished.

SUMMARY AND OBJECT OF THE INVENTION

According to one aspect of the present invention a self-scanned diode array is substituted for the CCD in spectrophotometers or other optical instruments. Due to the high quantum efficiency of the self-scanned diode arrays, full and smooth silicon spectral responses can be utilized.

In a spectrophotometer, however, use of self-scanned diode arrays despite their many advantages have resulted in a certain drawback not realized earlier in the art. This problem with the self scanned array was uncovered when the array was used to accomplish the intended purposes in the above-mentioned application of optical instruments. Upon commencing a sample measurement, after a certain period of dark time the amplitude of the first set of converted signals are always less than the amplitude of subsequent signals for the same sample. This phenomenon always occurs when the array is in a sustained dark state (approximately 10 seconds) before a reading is taken. As subsequent readings are taken (approximately 3 seconds apart), their values increase until approximately the fourth reading wherein the values are 0.7% higher than the initial readings.

This anomaly is analogous to sensitivity or gain changing. For example, for a white sample which is equivalent to 100% signal, the error in the initial reading is about 0.7%. For a 50% signal, the error in the initial readings reduces to 0.35%. One way to solve the problem is that every time the system has been in a sustained dark state, four or five sample measurements are taken every few seconds and once it is determined that the system has stabilized a measurement as an actual reading is taken. The drawback of this method is that for portable spectrophotometers with limited energy source, taking measurements before the actual reading causes a considerable drain on the batteries. Additionally, the life span of the components decrease considerably and measurements take a longer time. Furthermore, for moving objects, taking multiple sample readings often is not possible.

The anomaly discovered with the use of self-scanned diode array differs significantly from PSTL and Image Lag, since the error is not a fixed offset or threshold. In particular the error has been found to have an effect proportional to the intensity of the incident light. This error is analogous to sensitivity or gain changing. In addition, since no Image Lag occurs during the dark period after an illumination, the error is not interrelated to any other effect and the error remains independent for each illuminated scan.

In view of the foregoing, it is an object of the present invention to provide an image sensor with a stabilized gain.

Another object of the invention is to provide a spectrophotometer or an optical instrument which can analyze the spectral properties of samples without exposing samples to substantial heat.

Still another object of the present invention is to provide a spectrophotometer which can operate accurately with extremely short-duration pulses.

Another object of the present invention is to provide a method wherein such accurate measurements may be taken by the first illuminated scan regardless of the duration of unilluminated period prior to the scan or subsequent to the scan.

According to the present invention the sensitivity or gain changing of the error realized with the use of the self-scanned photo-diode array can be eliminated by using a gain stabilizer light emitting diode (LED) or similar stable light source. The gain stabilizer LED constantly illuminates the array so that photons are continuously impinging upon the self-scanned photodiode array. In the course of a typical measurement sequence, an illuminated scan is first taken, followed by a dark reading. A dark reading is made while the light source is not flashed. The dark reading may immediately follow right after the illuminated reading. Hence, a special timing scheme is not necessary to account for charge leakage decreasing effects. This allows the gain stabilizing LED illumination to be measured in a very short period of time and subtracted from the reading taken during the illuminated scan, resulting in a very accurate measurement.

BRIEF DESCRIPTION OF THE DRAWINGS

The accompanying drawings, referred to herein and constituting a part hereof, illustrate preferred embodiments of the method and system of the present invention, and together with the description serve to explain the principles of the invention in which.

DETAILED DESCRIPTION OF THE PREFERRED EMBODIMENT

Figure 1:
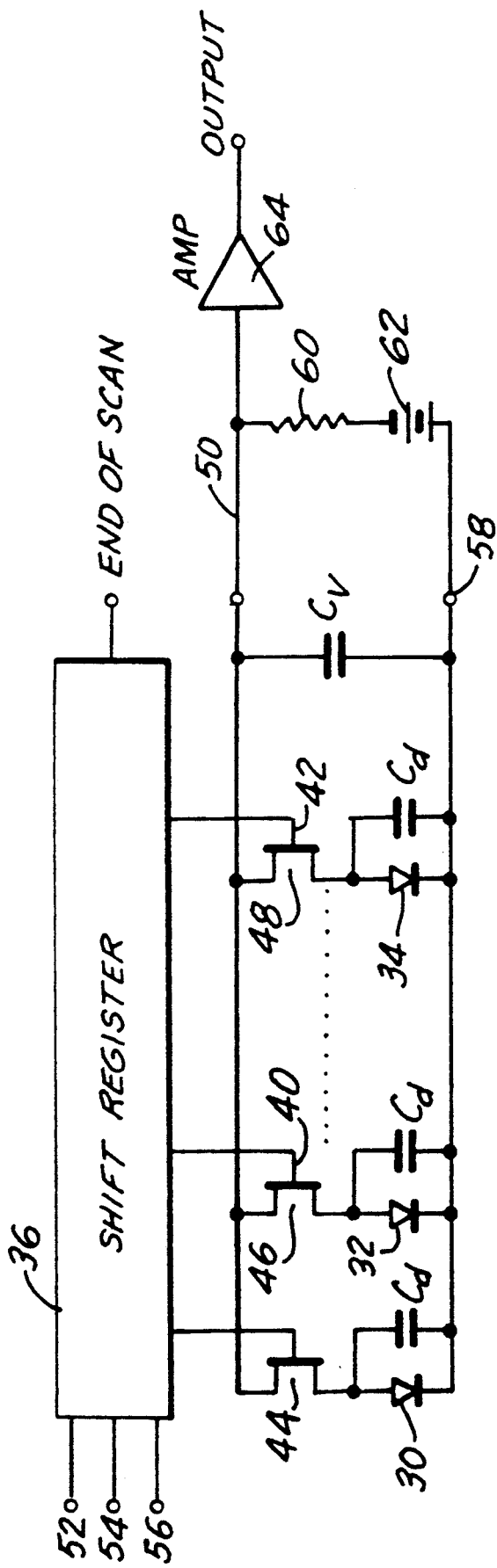
FIG. 1 is a block diagram depicting a self-scanned diode array.

The drawing in FIG. 1, illustrates a self-scanned diode array. As described in Tseng et al. "Evolution of the Solid State Image Sensor" Journal of Imaging Science, V.29 No. 1, p. 14–16, a self-scanned diode array consists of a silicon chip including a row of photodiodes 30, 32, . . . , 34, and a parallel shift register 36. Gates 38, 40, . . . , 42 are connected to separate stages of shift register 36. MOS switches 44, 46, . . . , 48, couple the adjacent photo-diodes 30, 32, . . . , 34, respectively to common video line 50. Shift register 36 is driven by complementary square wave clock voltages at terminals 52 and 54 and each scan is initiated by a start pulse at terminal 56. The start pulse loads a bit which is clocked through the register, successively closing and opening the switches, thus connecting each photo-diode in turn to the video line 50. As each photo-diode is accessed, it is charged to the video line potential and left open circuited until the next scan. During this open-circuit period, a photo-diode is discharged by an amount equal to the photo current integrated over the line scan time. Each time a photo diode is sampled, this integrated charge must be replaced through the video line 50. The resulting video signal is a train of charge pulses each having a magnitude proportional to the light intensity on the corresponding photo-diode. Resistor 60 and voltage sources 62 are connected in series between video line 50 and common line 58. When the MOS switches are turned on, the p-n junctions in diodes 30, 32 and 34 will be reset to a fixed potential equal to the voltage on the video line 50.

Figure 2:
FIG. 2 is a wave diagram illustrating a typical output of the self-scanned diode array of FIG. 1.

FIG. 2 is the wave diagram of the signal provided by the photo diode detector array of FIG. 1. As depicted, the signal is a train of charge pulses, each having a magnitude proportional to the light intensity directed on the corresponding photo diode. The video line is typically at 2.5 volts. The detector pulses coming out of the photo detector array are negative going, since the charge stored on each depletion-layer capacitor $C_d$ of FIG. 1, in each diode decays at a rate proportional to the incident illumination until the diode is coupled to the video line via the shift register. Therefore the amplitude of each pulse relates to the intensity of the light incident on the corresponding diode.

Figure 3:
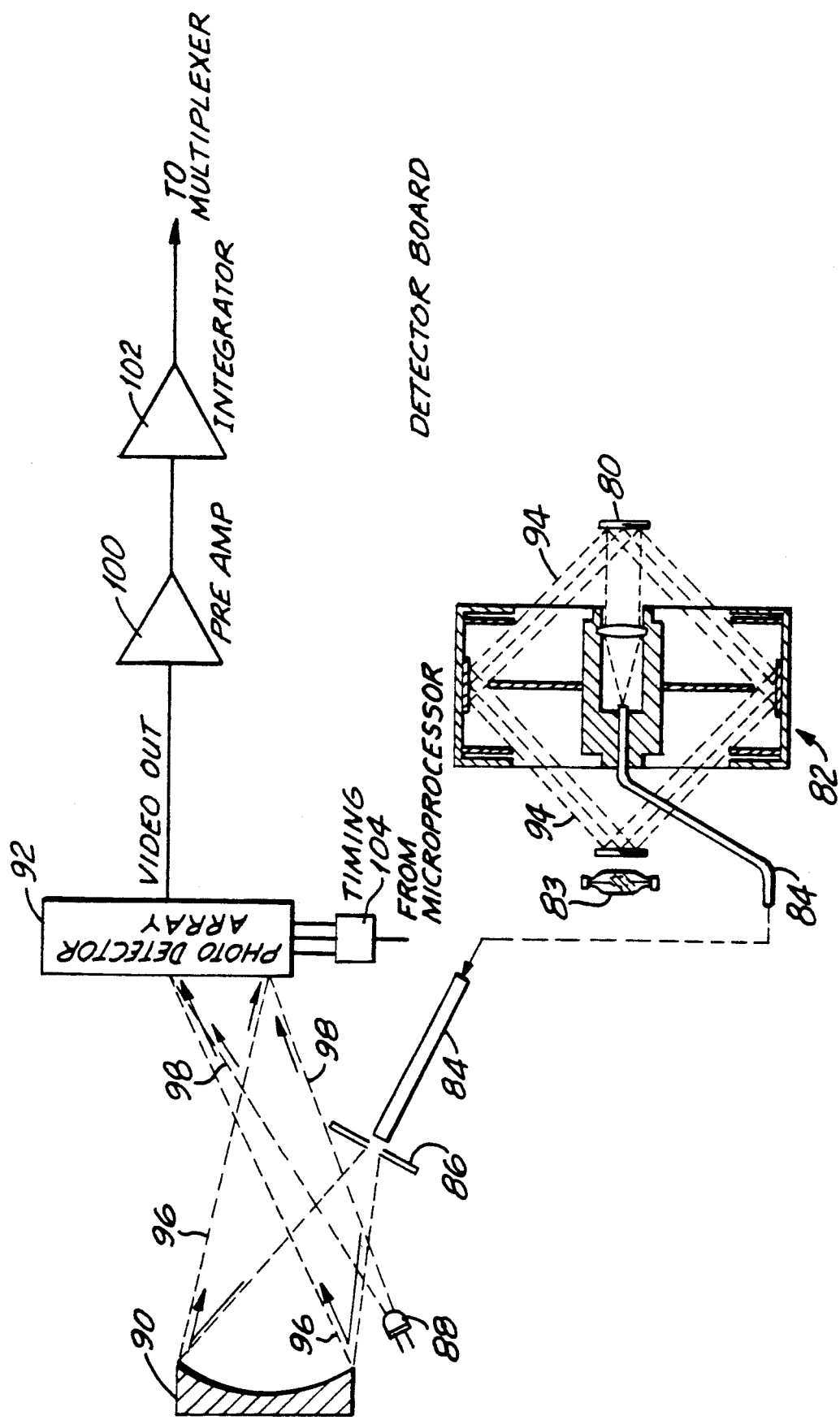
FIG. 3 is a diagram of the self-scanned diode array in conjunction with a spectrophotometer.

FIG. 3 illustrates the application of a self-scanned photo-diode array in an optical system in accordance with the invention. A suitable optical system is described in the U.S. Pat. No. 4,074,421, for "Spectrophotometer With Parallel Sensing," and is incorporated herein by reference. Another spectrophotmeter system is described in a copending application for "Hand Held Portable Spectrophotometer", and is incorporated herein by reference. The system includes an illumination system 82 for generating rays of illumination 94 from a light source such as a Xenon flashtube 83. A sample 80 being analyzed is located in front of illumination system 82. A fiber optic bundle 84 collects the light reflected off the surface of the sample and carries the light to the analysis portion of the system.

The analysis portion of the optical system includes an entrance slit 86 for restricting the angular spread of rays that proceed through the slit. A concave holographic grating 90 is located a certain distance from the entrance slit and receives the rays passing through the entrance slit. The holographic grating separates the incident light into its component wavelengths by deflecting each wavelength by a unique angle.

A self-scanned photodiode array 92 is located to receive the deflected light from holographic grating 90. Self-scanned photodiode array 92 converts the light into an electrical signal. Timing circuit 104 provides the clocks and start pulse circuitry for the detector array. The timing circuit is connected to a microprocessor 122 of FIG. 5. An example of a diode array is the SB series manufactured by EG & G RETICON, Sunnyvale, Calif.

The output of self-scanned photodiode array 92 is coupled to a preamplifier stage 100 for amplifying the video output from photodetector array 92. The output of the preamplifier is in turn connected to an integrator 102 for integrating each output pulse provided by the preamplifier over the period of the pulse. The output of the integrator is coupled to a multiplexer 112 as shown in FIG. 4.

Figure 4:
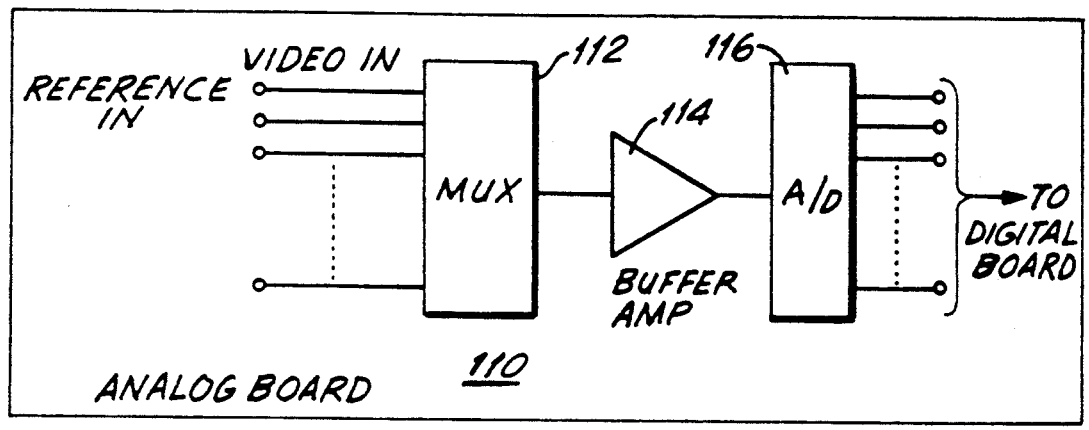
FIG. 4 is a block diagram of the analog board of the spectrophotmeter.

FIG. 4, illustrates the analog board 110 of the spectrophotometer. It contains multiplexer 112 coupled to a buffer amplifier 114. The output of the buffer is coupled to a 14 bit analog to digital (A/D) converter 116. The multiplexer selects one of many lines coupled to it, including the output of the spectral analyzer, and other analog information like battery pack power indication and temperature information. The output of the A/D converter 116 is coupled to an A/D buffer 124 as shown in FIG. 5.

Figure 5:
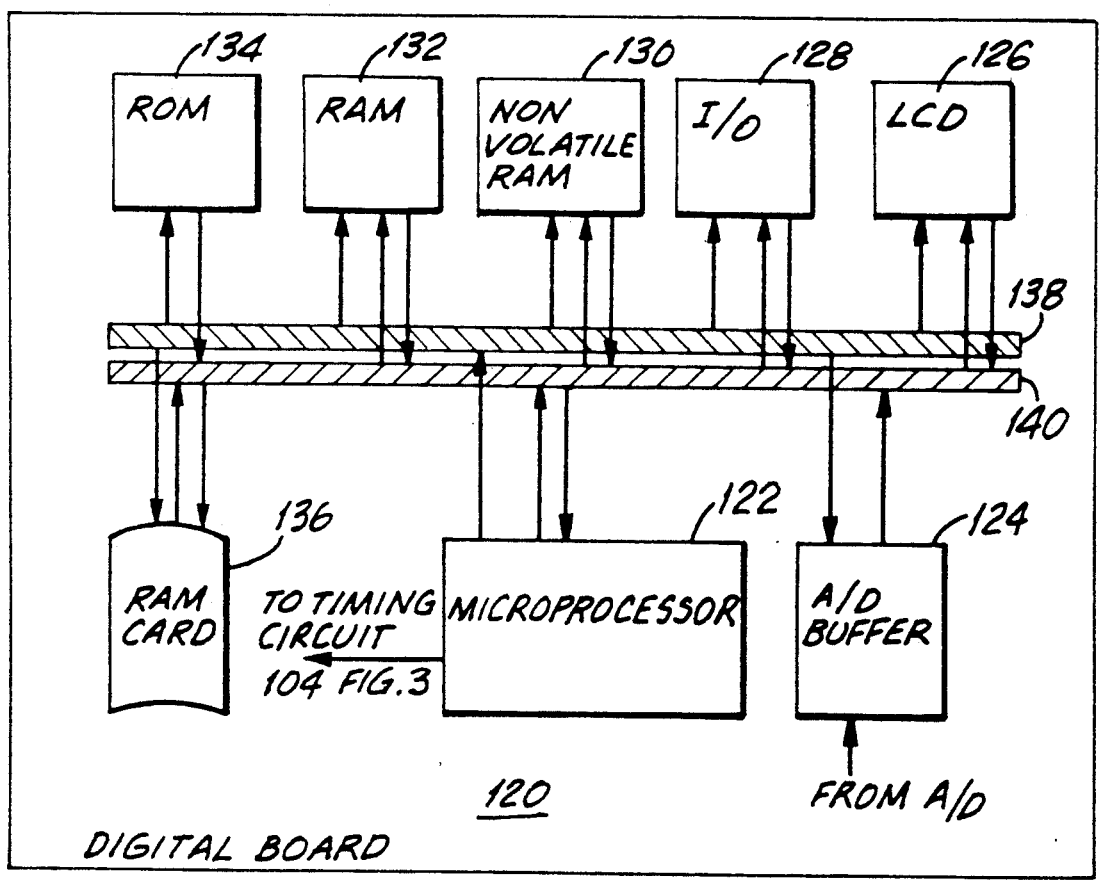
FIG. 5 is a block diagram of the digital board of the spectrophotometer.

FIG. 5, shows the digital board 120 of the spectrophotometer. The digital board contains a microprocessor 122. The microprocessor used in a preferred embodiment of this invention is a 80C188, which is a 16 bit microprocessor. The microprocessor is coupled to an address line 138 and a data line 140. Other components coupled to the address and data bus are A/D buffer 124, Liquid Crystal Display (LCD) 126, Keyboard (I/O) 128, Non Volatile RAM 130, RAM 132, ROM 134 and RAM card 136.

A/D buffer 124 contains the digital signal generated by a 14 bit A/D converter 116. ROM 134 contains color information of a white sample. This information is provided as a reference for calibrating the spectrophotometer before actual use. RAM 132 is a scratchpad memory. It contains information representing the output of the detector array after an illuminated sample reading and a non-illuminated sample reading, i.e., a dark reading. RAM 132 also contains coefficients generated upon calibrating the system with a white sample.

Non Volatile RAM 130, stores standard information of various colors. This information represent reference values against which the sample being analyzed is compared. RAM card 136 provides increased storage capacity and applications software packages. Information regarding color standards may be provided by the RAM card. LCD 126, and I/O 128 provide a visual interface with the user for selecting various functions of the spectrophotometer.

A light emitting diode (LED) 88 is located to provide low level illumination to self-scanned photodiode array 92. The LED is located outside the field of rays emanating from entrance slit 86 and concave holographic grating 90.

Sample 80 to be analyzed is positioned in front of the illuminator system 82. The Xenon flash tube 83 is used to illuminate the sample surface. Light reflected from the sample is collected and focused into fiber optic bundle 84. The fiber optic bundle carries the light to the analysis portion of the system. Light emanating from the end of the fiber optic 84 passes through entrance slit 86, which restricts the angular spread of rays. The rays that pass through the entrance slit impinge on a concave holographic grating 90, which is a preferred dispersive element.

Concave holographic grating 90 separates the incident light into its component wavelengths by deflecting each wavelength by a unique angle. Deflected light from the holographic grating impinges on the self-scanned photo-diode array 92 at different positions depending on the wavelength.

Gain stabilizing LED 88 constantly provides low level illumination to array 92 to improve accuracy of measurements. In the course of a measurement sequence the sample is first illuminated by the illuminator system 82, and the components of the deflected light are measured by the self-scanned diode array. The diode array begins scanning the individual diodes in the array upon receiving a start pulse from microprocessor 122. Hence the microprocessor is able to maintain a record of individual pulses received from the detector array. The pulse generated by each individual element in array 92 is due to the sum of the actual intensity of the incident component of light from the sample and the intensity of the light generated by LED 88.

The next step is to measure the signal generated from individual elements in array 92 without illuminating the sample, i.e. a dark reading. The effective signal generated from each individual element in the array is due to the intensity of light emanating from LED 88.

The signal measured during the dark reading is subtracted from the signal measured during the reading with the sample illuminated in order to obtain the actual reading.

The intensity of the light generated by the LED is normally about 0.1% of the intensity of the light reflected from a white sample. The intensity of the LED should be adjusted for specific systems to provide the minimum intensity required to eliminate the anomaly discovered in using self scanned diode array. LED 88 is able to stabilize the gain of self-scanned photodiode array. In another embodiment of the invention, it is possible to provide a gain stabilizer with an equivalent function as LED 88.

Each pulse in the pulse train at the output of diode array 92 as shown in FIG. 2 has a different amplitude due to the intensity of the light component deflected on each diode in the array with a different wavelength.

The output of the diode array is amplified by preamplifier stage 100 and is then integrated by integrator 102. The output of the integrator is a pulse train, amplitude of each pulse representing the area under the pulses provided by the diode array. In another embodiment of the invention, the integrator can be replaced by a peak detector to detect the peak amplitude of each pulse provided by the array 92.

The output of integrator 102 is multiplexed by multiplexer 112, and is coupled to the 14 bit A/D converter 116 through a buffer 114. The maximum count for the highest intensity light impinged on the array is therefore equal to $2^{14}$ bits, (16384). This number of counts represents a sample that could reflect 200% light at the narrow band of wavelengths. White tile reflects about 100% light and fluorescent samples can reflect greater than 200% light. Analog to digital converter 116 responds to a maximum value 6 volts, and therefore each count is equivalent to about 0.3 millivolt.

In the preferred embodiment of this invention the LED intensity is roughly 20 counts or about 7 millivolts, which provides corrected readings and stabilized diode array gain based on the method described herein. The digital values from the A/D converter 116 are stored in A/D buffer 124 on digital board 120 as illustrated in FIG. 5. Microprocessor 122 retrieves the digital value corresponding to each pulse provided by the detector array 92 and multiplies that value by the appropriate coefficient that is stored in scratch pad memory 132. There is a coefficient factor stored for each component wavelength of the light deflected from sample 80. Since the microprocessor determines the beginning of the scan in the detector array 92, the wavelengths of the light incident on the corresponding diodes that generate the output pulses are readily ascertainable. The coefficients are derived upon calibration as it will be explained later. Thereafter the microprocessor stores the processed digital value in the scratch pad memory. The digital values for the dark reading and the illuminated reading are subtracted from each other by the microprocessor to derive the final corrected reading of the light reflected from sample 80.

Non Volatile RAM 130, contains the reference standard information of various colors. The final corrected reading of the light reflected from sample 80 is then compared with the information contained in the RAM 130 in order to determine whether the sample has the desired color characteristics. The reference standard information is supplied by the user by downloading the information by RAM card 136. The information contained in the RAM card can be a uniform standard for various colors provided by the manufacturer. Alternatively the user can specify a desired standard and analyze samples against such user-defined standard.

The spectrophotometer should be calibrated prior to actual sample analysis. For this purpose, ROM 134 contains factory provided information for the color White. When the spectrophotometer is turned on, first a reading of a White tile is taken as discussed before by taking an illuminated reading and a dark reading and subtracting the information to derive the final reading. This information is compared against the information stored in the ROM 134 which contains the desired values for any White reading. If the actual White reading is different from the reference values stored in the ROM, microprocessor 122 derives appropriate coefficients that when multiplied by the actual readings the desired readings are achieved. At this point the system is calibrated and the coefficients will be stored in RAM 130 for normalizing the pulses derived by the diode detector 92.

Thus the method and system according to the present invention advantageously permits accurate, efficient and reliable light measurements. The system as described is capable of making accurate measurements with one illumination scan which enhances efficiency and optimal speed.

Other advantages of self-scanned diode arrays are ease of manufacturing, flexibility Of design, low dark current, high sensitivity to light, and most importantly no imaging problem resulting from charge transfer loss or PSTL as in CCD arrays.

The invention in its broader aspects therefore is not limited to the specific embodiment shown herein. Departures may be made therefrom within the scope of the accompanying claims without departing from the principles of the invention and without sacrificing its chief advantages.

What is claimed is:

1. A system for parallel sensing and analyzing light, comprising:
   a photodiode detector array for converting the light into an electrical signal, the amplitude of said electrical signal corresponding to the illumination level of light detected by the separate photodiodes of said array;
   a gain stabilizer for stabilizing the conversion gain of said photodiode detector array including a light source for providing constant low level illumination to photodiodes in said array said gain stabilizer providing a stable conversion gain by said photodiodes at the first illumination of said diodes after a substantial unilluminated period.

2. A system according to claim 1, wherein said light source of said gain stabilizer is a light emitting diode.

3. A system according to claim 1, further comprising:
   means for taking a dark signal reading from said photodiode detector array when said photodiodes are illuminated only by said light source;
   means for taking an illuminated reading from said photodiode detector array when said photodiode array is illuminated by light being analyzed and light from said light source; and
   means for subtracting said dark reading from said illuminated reading to derive a final reading of said light being analyzed.

4. A system according to claim 3 further comprising:
   means for converting an electrical signal generated by said photodiode detector array into a digital value;
   means for storing a first digital value derived from said illuminated reading and a second digital value derived from said dark reading;
   means for subtracting said second digital value from said first digital value for deriving a measurement of said light to be analyzed.

5. A spectrophotometer with parallel sensing for analyzing a light reflected by a sample comprising:
   a light source for illuminating the sample;
   means for collecting light reflected from the sample;
   means for deflecting light reflected from the sample according to wavelength to separate said reflected light into component wavelengths;
   a photodiode detector array where photodiodes of said photodiode detector array receive light of different component wavelengths, said photodiode detector array being capable of providing an electrical signal corresponding to the illumination level of said component wavelengths;

a gain stabilizer for stabilizing the conversion gain of said photodiode detector array, said gain stabilizer including a low level light source for illuminating photodiodes of said photodiode detector array with a constant low level illumination;

means for taking a dark signal reading from said photo diode detector array when said photodiodes are illuminated only by said light source of said gain stabilizer;

means for taking an illuminated reading from said photodiode detector array when said photodiode array is illuminated by light being analyzed and light from said light source of said gain stabilizer; and means for subtracting said dark reading from said illuminated reading to derive a final reading of said light being analyzed.

6. The spectrophotometer as claimed in claim 5, wherein said light source of said gain stabilizer is an light emitting diode.

7. The spectrophotometer as claimed in claim 6, further comprising:

means for converting said electrical signal generated by said photodiode detector array into a digital value;

means for storing a first digital value derived from said illuminated reading and a second digital value derived from said dark reading; and means for subtracting said second digital value from said first digital value for deriving a measurement of said light to be analyzed.

8. A method for parallel sensing and analyzing of light, comprising the steps of:

converting the light into an electrical signal by a photodiode detector array, the amplitude of said electrical signal corresponding to the illumination level of light detected by separate photodiodes of said array;

stabilizing the conversion gain of said photodiode detector array by a gain stabilizer including a light source for providing constant low level illumination to photodiodes in said array said gain stabilizers providing a stable conversion gain by said photodiodes at the first illumination of said diodes after a substantial unilluminated period.

9. A method according to claim 8, wherein said light source of said gain stabilizer is a light emitting diode.

10. A method according to claim 8, further comprising:

taking a dark signal reading from said photodiode detector array when said photodiodes are illuminated only by said light source;

taking an illuminated reading from said photodiode detector array when said photo diode array is illuminated by light being analyzed and light from said light source; and subtracting said dark reading from said illuminated reading to derive a final reading of said light being analyzed.

11. A method according to claim 10 further comprising the steps of:

converting said electrical signal generated by said photodiode detector array during said illuminated reading into a first digital value;

converting said electrical signal generated by said photodiode array during said dark reading;

storing said first digital value and said second digital value;

subtracting said second digital value from said first digital value for deriving a measurement of said light to be analyzed.

12. In a spectrophotometer a method for parallel sensing and analyzing a light reflected by a sample comprising the steps of:

illuminating said sample by a light source;

collecting light reflected from the sample;

deflecting light reflected from the sample according to wavelength to separate said reflected light into component wavelengths;

receiving light of different component wavelengths, by photodiodes of a photodetector array said photodiodes being capable of providing an electrical signal corresponding to the illumination level of said component wavelengths;

stabilizing the conversion gain of said photodiode detector array by a gain stabilizer, said gain stabilizer including a low level light source for illuminating said photodiodes of said photodiode detector array with a constant low level illumination;

taking a dark signal reading from said photodiode detector array when said photodiodes are illuminated only by said light source of said gain stabilizer;

taking an illuminated reading from said photodiode detector array when said photodiode array is illuminated by light being analyzed and light from said light source of said gain stabilizer; and subtracting said dark reading from said illuminated reading to derive a final reading of said light being analyzed.

13. The method as claimed in claim 12, wherein said light source of said gain stabilizer is a light emitting diode.

14. The method as claimed in claim 13, further comprising the steps of:

converting said electrical signal generated by said photodiode detector array during said illuminated reading into a first digital value;

converting said electrical signal generated by said photodiode detector array during said dark reading;

storing said first digital value and said second digital value;

subtracting said second digital value from said first digital value for deriving a measurement of said light to be analyzed.

* * * * *